United States Patent
Roytman et al.

(10) Patent No.: US 8,020,108 B1
(45) Date of Patent: Sep. 13, 2011

(54) SEPARATION OF PRESENTATION AND BUSINESS MODELS FOR COMMON MANAGEMENT PLATFORM TASKS IN A STORAGE AREA NETWORK

(75) Inventors: Evgeny Roytman, Sharon, MA (US); Eyal Kedem, Newton, MA (US); Michael Virgil, Northborough, MA (US); Michael G. Hegerich, Holliston, MA (US); Andrew S. Becher, Rochester, MN (US)

(73) Assignee: EMC Corporation, Hopkinton, MA (US)

( * ) Notice: Subject to any disclaimer, the term of this patent is extended or adjusted under 35 U.S.C. 154(b) by 274 days.

(21) Appl. No.: 11/540,160

(22) Filed: Sep. 29, 2006

(51) Int. Cl.
*G06F 3/00* (2006.01)

(52) U.S. Cl. ........ 715/762; 715/853; 715/965; 717/110; 717/113; 709/223

(58) Field of Classification Search .................. 715/762, 715/853, 965; 717/710, 713; 709/223
See application file for complete search history.

(56) References Cited

U.S. PATENT DOCUMENTS

| | | | | |
|---|---|---|---|---|
| 5,715,413 A | * | 2/1998 | Ishai et al. | 715/825 |
| 5,796,951 A | * | 8/1998 | Hamner et al. | 709/223 |
| 6,177,942 B1 | * | 1/2001 | Keong et al. | 715/810 |
| 6,239,800 B1 | * | 5/2001 | Mayhew et al. | 715/764 |
| 6,268,853 B1 | * | 7/2001 | Hoskins et al. | 700/83 |
| 6,854,088 B2 | * | 2/2005 | Massengale et al. | 715/764 |
| 6,950,990 B2 | * | 9/2005 | Rajarajan et al. | 715/736 |
| 7,275,098 B1 | * | 9/2007 | Becher et al. | 709/223 |
| 2003/0093509 A1 | * | 5/2003 | Li et al. | 709/223 |
| 2003/0149761 A1 | * | 8/2003 | Baldwin et al. | 709/224 |
| 2004/0056903 A1 | * | 3/2004 | Sakai | 345/853 |
| 2004/0263658 A1 | * | 12/2004 | Cozier et al. | 348/333.01 |
| 2005/0268280 A1 | * | 12/2005 | Fildebrandt | 717/113 |
| 2007/0288883 A1 | * | 12/2007 | Soroker et al. | 717/100 |
| 2009/0118845 A1 | * | 5/2009 | Eldridge et al. | 700/86 |

* cited by examiner

*Primary Examiner* — Alvin H Tan
(74) *Attorney, Agent, or Firm* — Krishnendu Gupta; Gerald P. Kazanjian

(57) ABSTRACT

Methods and systems for separating presentation and business models for common management platform tasks in a storage area network (SAN) are disclosed. A graphical user interface (GUI) object may be mapped to a task object, which include action(s) performed on a SAN. A selection of task objects from a collection of task objects is received, which are needed to implement the underlying functionality of a GUI object. The collection of task objects is part of a task framework. An arrangement of the task objects according to a hierarchy of the framework is received. The hierarchy includes simple task objects, corresponding to actions performed on a SAN, and composite task objects, corresponding to at least two simple task objects and may include other composite task objects. The arranged task objects are mapped to the GUI object by extending a presentation object to encapsulate the GUI object and the arranged task objects.

20 Claims, 10 Drawing Sheets

| Task List / Task / Operation | Status | Description |
|---|---|---|
| ⊟ Task List | Pending | |
| ⊟ TaskA | Pending | Create 3 meta devices with capacity of 20GM each in Symmetrix 000000123456 |
| OperationA | Pending | Create meta device with Symmetrix 000000123456 device OOF as head |
| OperationB | Pending | Add 010 to Symmetrix 000000123456 meta device OOF |
| OperationC | Pending | Remove 021 from Symmetrix 000000123456 meta device 12B |
| OperationD | Pending | Dissolve Symmetrix 000000123456 meta device 23A |
| ⊞ TaskB | Pending | Create new devices with certain size and attributes out of free disk space |
| ⊞ Task C | Pending | Change device configuration |

TASK DETAIL - Pending Task A

Status Log | Operations | Details

| Operation | Status | Description | Start Date | End Date |
|---|---|---|---|---|
| OperationA | Pending | Description of User Operation | Thu Jul 03 12:56:14 EDT 2003 | Thu Jul 03 12:56:47 EDT 2003 |
| OperationB | Pending | Description of User Operation | Thu Jul 03 12:56:14 EDT 2003 | Thu Jul 03 12:56:47 EDT 2003 |
| OperationC | Pending | Description of User Operation | Thu Jul 03 12:56:14 EDT 2003 | Thu Jul 03 12:56:47 EDT 2003 |
| OperationD | Pending | Description of User Operation | Thu Jul 03 12:56:14 EDT 2003 | Thu Jul 03 12:56:47 EDT 2003 |

FIG. 2A

401 RECEIVE A SELECTION OF TASK OBJECTS FROM A COLLECTION OF TASK OBJECTS, WHEREIN THE SELECTED TASK OBJECTS ARE NEEDED TO IMPLEMENT THE UNDERLYING FUNCTIONALITY OF A GRAPHICAL USER INTERFACE OBJECT, WHEREIN THE COLLECTION OF TASK OBJECTS IS PART OF A TASK FRAMEWORK

402 RECEIVE AN ARRANGEMENT OF THE TASK OBJECTS ACCORDING TO A TASK HIERARCHY OF THE TASK FRAMEWORK, WHEREIN THE HIERARCHY COMPRISES SIMPLE TASK OBJECT AND COMPOSITE TASK OBJECTS, WHEREIN SIMPLE TASK OBJECTS CORRESPOND TO AN ACTION PERFORMED ON A STORAGE AREA NETWORK, AND WHEREIN COMPOSITE TASK OBJECTS CORRESPOND TO AT LEAST TWO SIMPLE TASK OBJECTS AND MAY INCLUDE OTHER COMPOSITE TASK OBJECTS

403 MAP THE ARRANGED TASK OBJECTS TO THE GRAPHICAL USER INTERFACE OBJECT BY EXTENDING A PRESENTATION OBJECT TO ENCAPSULATE THE GRAPHICAL USER INTERFACE OBJECT AND THE ARRANGED TASK OBJECTS

TO FIG. 4B STEP 404

FIG. 4A

501 SELECT A FIRST GRAPHICAL USER INTERFACE OBJECT FOR THE STORAGE AREA NETWORK MANAGEMENT GRAPHICAL USER INTERFACE, WHEREIN UNDERLYING FUNCTIONALITY OF THE SELECTED FIRST GRAPHICAL USER INTERFACE OBJECT CAUSES ONE OR MORE ACTIONS TO OCCUR ON A STORAGE AREA NETWORK UPON ACTIVATION OF THE FIRST GRAPHICAL USER INTERFACE OBJECT

502 DETERMINE WHAT TASK OBJECTS FROM A COLLECTION OF TASK OBJECTS ARE NEEDED TO IMPLEMENT THE UNDERLYING FUNCTIONALITY OF THE FIRST GRAPHICAL USER INTERFACE OBJECT, WHEREIN THE COLLECTION OF TASK OBJECTS IS PART OF A TASK FRAMEWORK, WHEREIN THE TASK FRAMEWORK INCLUDES MODULES FOR EXECUTING TASK OBJECTS

503 ARRANGE THE DETERMINED TASK OBJECTS ACCORDING TO A TASK HIERARCHY OF THE TASK FRAMEWORK, WHEREIN THE HIERARCHY COMPRISES SIMPLE TASK OBJECT AND COMPOSITE TASK OBJECTS, WHEREIN SIMPLE TASK OBJECTS CORRESPOND TO AN ACTION PERFORMED ON A STORAGE AREA NETWORK, AND WHEREIN COMPOSITE TASK OBJECTS CORRESPOND TO AT LEAST TWO SIMPLE TASK OBJECTS AND MAY INCLUDE OTHER COMPOSITE TASK OBJECTS

504 EXTEND A PRESENTATION OBJECT TO ENCAPSULATE THE FIRST GRAPHICAL USER INTERFACE OBJECT AND THE ARRANGED TASK OBJECTS FOR THE FIRST GRAPHICAL USER INTERFACE OBJECT, WHEREIN THE PRESENTATION OBJECT MAPS THE FIRST GRAPHICAL USER INTERFACE OBJECT TO THE ARRANGED TASK OBJECTS

505 SELECT A SECOND GRAPHICAL USER INTERFACE OBJECT FOR THE STORAGE AREA NETWORK MANAGEMENT GRAPHICAL USER INTERFACE, WHEREIN UNDERLYING FUNCTIONALITY OF THE SELECTED SECOND GRAPHICAL USER INTERFACE OBJECT CAUSES ONE OR MORE ACTIONS TO OCCUR ON A STORAGE AREA NETWORK UPON ACTIVATION OF THE SECOND GRAPHICAL USER INTERFACE OBJECT

TO FIG. 5B STEP 506

FIG. 5A

601 SELECT A FIRST GRAPHICAL USER INTERFACE OBJECT FOR THE STORAGE AREA NETWORK MANAGEMENT GRAPHICAL USER INTERFACE, WHEREIN UNDERLYING FUNCTIONALITY OF THE SELECTED FIRST GRAPHICAL USER INTERFACE OBJECT CAUSES ONE OR MORE ACTIONS TO OCCUR ON A STORAGE AREA NETWORK UPON ACTIVATION OF THE FIRST GRAPHICAL USER INTERFACE OBJECT

> 605 DETERMINE A FUNCTION TO BE PROVIDED BY THE STORAGE AREA NETWORK MANAGEMENT GRAPHICAL USER INTERFACE

> 606 SELECT ONE OR MORE GRAPHICAL USER INTERFACE OBJECTS TO BE ASSOCIATED WITH THE DETERMINED FUNCTION

>> 609 USE ONE OR MORE GRAPHICAL USER INTERFACE OBJECTS FROM A PRE-EXISTING GRAPHICAL USER INTERFACE

607 IF MORE THAN ONE GRAPHICAL USER INTERFACE OBJECT IS SELECTED, DETERMINING, ARRANGING, AND EXTENDING ARE PERFORMED FOR EACH SELECTED GRAPHICAL USER INTERFACE OBJECT

> 608 MORE THAN ONE GRAPHICAL USER INTERFACE OBJECT IS SELECTED AND WHEREIN DURING THE REPEATING OF ARRANGING THE DETERMINED TASK OBJECTS, USING AT LEAST PART OF AN ARRANGEMENT OF TASK OBJECTS FOR A FIRST GRAPHICAL USER INTERFACE OBJECT AS PART OF AN ARRANGEMENT OF TASK OBJECTS FOR A SECOND GRAPHICAL USER INTERFACE OBJECT

TO FIG. 6B STEP 602

FIG. 6A ically. Further, improvements to the graphical user interface need not require changes to the underlying business model of the task management framework.

SEPARATION OF PRESENTATION AND BUSINESS MODELS FOR COMMON MANAGEMENT PLATFORM TASKS IN A STORAGE AREA NETWORK

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software-processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. Additional software applications may interact with. ECC to obtain information that may be used by a user to design and refine the configuration of the storage area network, such as the SAN Advisor family of products, also available from EMC Corporation of Hopkinton, Mass.

SUMMARY

Application developers work to refine and improve software applications so that they execute more efficiently and quickly and so that they are more user-friendly than past versions. However, users of software applications typically become used to and familiar with a certain graphical user interface, particularly users who interact with the graphical user interface day after day after day. While users often appreciate new versions of software applications that work faster and more efficiently, and in so doing improve the user's experience, changes to a familiar graphical user interface may frustrate users. The time saved due to the improved performance of the software application may be lost as a user becomes familiar with the new graphical user interface and how the user must interact with it versus the graphical user interface that the user was familiar with to achieve the same functionality. For example, storage area network administrators may be very familiar with EMC's ECC management application, and particularly its graphical user interface. However, the design of ECC dictates that, when the underlying functionality of the application is changed, the graphical user interface that allows a user to execute that underlying functionality must also change. The graphical user interface is inextricably linked to the task management framework that provides the functionality of ECC such that a change in one often necessitates a change in the other.

Embodiments disclosed below allow for the separation of the graphical user interface from the underlying functionality provided by a task management framework, such that improvements to the business model need not require changes to the graphical user interface a user is intimately familiar with. A new task management framework is provided that allows an application developer to improve underlying functionality in a new version of an application while retaining the graphical user interface of an older version of the application. The new task management framework includes building blocks, known as task objects, which allow an application developer robust flexibility in the design of an application. The task management framework provides two types of building blocks. A simple tasks object is the lowest level action or command that may occur on a storage area network. A composite task object includes one or more simple task objects, and may include other composite task objects as well. For example, a composite task object known as "Composite 1" may include 4 simple task objects in total: "Simple 1", "Simple 2", and the composite task object "Composite 2", which includes "Simple 3" and "Simple 4". The organization of task objects according to the framework is such that task objects may be arranged in any such way along this hierarchy. For example, a composite task object known as "Composite 3" may include the same "Composite 2" composite task object that "Composite 1" contains, as well as other simple task objects and/or composite task objects not found in "Composite 1".

By separating the task objects from the graphical user interface, embodiments allow a graphical user interface to be designed in any way without that design being necessitated by the underlying functionality provided by the task objects, and vice versa. For example, the nomenclature of the underlying task objects need not be the same nomenclature of the graphical user interface objects. A button on the graphical user interface labeled as "Map Port" may activate underlying task objects to achieve that function, but none of those underlying task objects need be called "Map Port". In addition to allowing application developers the ability to improve underlying functionality while maintaining a familiar graphical user interface, the separation of task objects from the graphical user interface also allows application developers to design a graphical user interface according to best design principles for the interface, without having to worry about how the design of the interface affects the underlying design of the task objects.

The task management framework includes two components, a task manager component and a view component. The task manager component deals with the execution of task objects, including tracking the status of task object execution, allocating processor resources and other resources during the execution of tasks, and the like, and provides access to data about the task objects. The view component deals with presentation objects. A presentation object extends to encapsulate both a graphical user interface object and the task objects needed to provide the underlying functionality of the graphical user interface object. In other words, a presentation object maps a graphical user interface object to one or more task objects. The view component allows an application developer to look at the mapping. A base presentation object is provided with the task management framework, and this base presentation object may be changed by the application developer as needed.

For example, say an application developer wants a single GUI object, such as a button, to provide the functionality of mapping a new disk storage unit to a port on a storage area network. Within the task management framework, three simple task objects are needed to accomplish this functionality. The application developer will thus arrange the three simple task objects so that they map, via a presentation object, to the single GUI object. The user need not know that three tasks are required to provide the functionality of the GUI object. Alternatively, the application developer may use two GUI objects to provide the desired functionality, and have one GUI object map to two of the three necessary tasks, and have the other GUI object map to the remaining third task.

More particularly, in an embodiment there is provided a method of mapping a graphical user interface object to an underlying task object, wherein task objects include actions performed on a storage area network. The method includes receiving a selection of task objects from a collection of task objects, wherein the selected task objects are needed to implement the underlying functionality of a graphical user interface object, wherein the collection of task objects is part of a task framework; receiving an arrangement of the task objects according to a task hierarchy of the task framework, wherein the hierarchy comprises simple task object and composite task objects, wherein simple task objects correspond to an action performed on a storage area network, and wherein composite task objects correspond to at least two simple task objects and may include other composite task objects; and mapping the arranged task objects to the graphical user interface object by extending a presentation object to encapsulate the graphical user interface object and the arranged task objects.

In a related embodiment, the method may include receiving a selection of a graphical user interface object, wherein underlying functionality of the graphical user interface object causes one or more actions to occur on a storage area network upon activation of the graphical user interface object. In a further related embodiment, receiving a selection of a graphical user interface object may include receiving a selection of multiple graphical user interface objects; and wherein receiving a selection of task objects, receiving an arrangement of task objects, and mapping may be performed for each received graphical user interface object. In yet a further related embodiment, the method may include during the repeating of receiving an arrangement of task objects, using at least part of an arrangement of task objects for a first graphical user interface object as part of an arrangement of task objects for a second graphical user interface object. In another further related embodiment, the method may include providing an initial presentation object, wherein an initial presentation object is used to create the presentation object for each graphical user interface object in the selection of multiple graphical user interface objects. In yet another further embodiment, the method may include creating a storage area network management product graphical user interface by joining the graphical user interface objects together, wherein the storage area network management product graphical user interface includes the underlying presentation objects and the arranged task objects of the joined graphical user interface objects.

In another related embodiment, the task framework may include modules for executing task objects, and the method may include receiving an activation command for a graphical user interface object; and using the modules to execute the task objects that are mapped from that graphical user interface object via the presentation object.

In another embodiment, there is provided a computer program product, stored on computer readable medium, to map a graphical user interface object to an underlying task object, wherein task objects include actions performed on a storage area network. The computer program product includes computer program code for receiving a selection of task objects from a collection of task objects, wherein the selected task objects are needed to implement the underlying functionality of a graphical user interface object, wherein the collection of task objects is part of a task framework; computer program code for receiving an arrangement of the task objects according to a task hierarchy of the task framework, wherein the hierarchy comprises simple task object and composite task objects, wherein simple task objects correspond to an action performed on a storage area network, and wherein composite task objects correspond to at least two simple task objects and may include other composite task objects; and computer program code for mapping the arranged task objects to the graphical user interface object by extending a presentation object to encapsulate the graphical user interface object and the arranged task objects.

In yet another embodiment, there is provided a method of mapping a graphical user interface object to an underlying task object, wherein task objects include actions performed on a storage area network, and wherein graphical user interface objects comprise a graphical user interface of a storage area network management product. The method includes selecting a first graphical user interface object for the storage area network management graphical user interface, wherein underlying functionality of the selected first graphical user interface object causes one or more actions to occur on a storage area network upon activation of the first graphical user interface object; determining what task objects from a collection of task objects are needed to implement the underlying functionality of the first graphical user interface object, wherein the collection of task objects is part of a task framework, wherein the task framework includes modules for executing task objects; arranging the determined task objects according to a task hierarchy of the task framework, wherein the hierarchy comprises simple task object and composite task objects, wherein simple task objects correspond to an action performed on a storage area network, and wherein composite task objects correspond to at least two simple task objects and may include other composite task objects; and extending a presentation object to encapsulate the first graphical user interface object and the arranged task objects for the first graphical user interface object, wherein the presentation object maps the first graphical user interface object to the arranged task objects.

It is to be understood that the system of the present application can be embodied solely as a software program, or as a software program operating in conjunction with corresponding hardware. For example, embodiments of the present application may be implemented in EMC's ECC Console software application that provides graphical configuration management functionality of storage area network resources. Embodiments of the present application may also be implemented in computer devices that operate the ECC Console software. ECC Console software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A and 2B are screenshots of the task manager module and the view module of the task management framework that execute on the computer system of FIG. 1.

DETAILED DESCRIPTION

Figure 1:
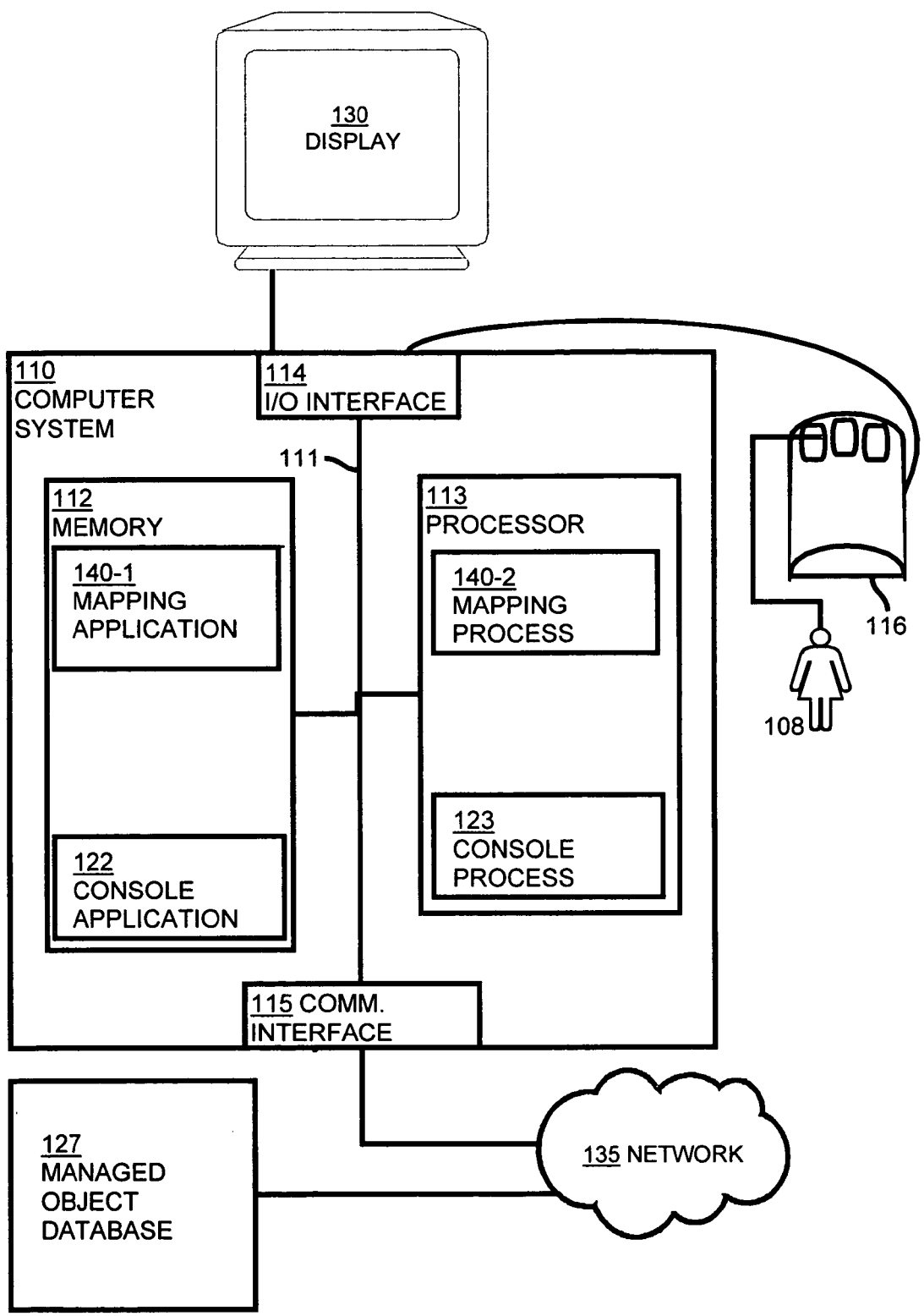
FIG. 1 shows a high-level block diagram of a computer system according to one embodiment disclosed herein.

Generally, disclosed embodiments include methods and systems for separating a graphical user interface from the underlying task objects that provide functionality to the graphical user interface. Thus, improvements to the operation of the underlying task objects need not require changes to the graphical user interface, so that a graphical user interface that a user is intimately familiar with may remain the same even if the underlying functionality has been improved. A new task management framework is provided that allows an application developer to improve underlying functionality in a new version of an application while retaining the graphical user interface of an older version of the application. The new task management framework includes building blocks, known as task objects, which allow an application developer robust flexibility in the design of an application. The task management framework provides two types of building blocks. A simple tasks object is the lowest level action or command that may occur on a storage area network. A composite task object includes one or more simple task objects, and may include other composite task objects as well. For example, a composite task object known as "Composite 1" may include 4 simple task objects in total: "Simple 1", "Simple 2", and the composite task object "Composite 2", which includes "Simple 3" and "Simple 4". The organization of task objects according to the framework is such that task objects may be arranged in any such way along this hierarchy. For example, a composite task object known as "Composite 3" may include the same "Composite 2" composite task object that "Composite 1" contains, as well as other simple task objects and/or composite task objects not found in "Composite 1".

By separating the task objects from the graphical user interface, embodiments allow a graphical user interface to be designed in any way without that design being necessitated by the underlying functionality provided by the task objects, and vice versa. For example, the nomenclature of the underlying task objects need not be the same nomenclature of the graphical user interface objects. A button on the graphical user interface labeled as "Map Port" may activate underlying task objects to achieve that function, but none of those underlying task objects need be called "Map Port". In addition to allowing application developers the ability to improve underlying functionality while maintaining a familiar graphical user interface, the separation of task objects from the graphical user interface also allows application developers to design a graphical user interface according to best design principles for the interface, without having to worry about how the design of the interface affects the underlying design of the task objects.

The task management framework includes two components, a task manager component and a view component. The task manager component deals with the execution of task objects, including tracking the status of task object execution, allocating processor resources and other resources during the execution of tasks, and the like, and provides access to data about the task objects. The view component deals with presentation objects. A presentation object extends to encapsulate both a graphical user interface object and the task objects needed to provide the underlying functionality of the graphical user interface object. In other words, a presentation object maps a graphical user interface object to one or more task objects. The view component allows an application developer to look at the mapping. A base presentation object is provided with the task management framework, and this base presentation object may be changed by the application developer as needed.

The task manager module manages execution of tasks and provides access to data about tasks in the system. When a task is to be executed, it is submitted to the task manager module through a task manager interface. At task submission time, an application has to guarantee that the following data is defined: task scheduling information, authorization and resource reservation information for the task and all internal tasks in case of composite task, as well as task ownership information, where task ownership is defined as that of the task submitter.

Composite tasks define a logical operation to be performed on the set of managed objects. Simple tasks define an atomic action in the system and usually map to operation on single managed objects. The task manager module provides control of execution of composite tasks. The execution of simple tasks is delegated to system components such as domain managers or providers that have access to managed objects specified in the tasks.

One example of a composite task is an application request to provision a specific amount of storage to a specified host. This request defines a logical operation and its execution spans across three storage management domains in the storage area network: host, array and fabric domains.

An example of simple task is a request to create a device of a specific size on a specified storage array. Execution of this task requires access to a logical instance of the specified storage array in the system repository and requires specialized software that may change a configuration of the physical storage array. To insure consistency, the system has to execute a repository update and a change of the physical storage array within the same transaction.

The scope of task execution management requires task management service to provide the following operations: task submission, cancellation of previously submitted tasks, initiation of task execution, abort of task execution, resume execution of previously aborted tasks from the first uncompleted subtask, and retry execution of failed task. To answer application requirements, the task manager uses authorization, scheduling, resource calendar and reservation services in the process of task management. To notify applications about lifecycle changes of the submitted tasks, the task manager provides task instance events and task change events (for task state) for tasks under management.

Applications access the Task Management Service through well-defined interfaces: ITaskExecutionManager and ITaskQueryManager. The ITaskExecutionManager interface has methods to control task execution flow (submit, stop, resume, retry, cancel). The ITaskExecutionManager also provides a method to register the ITaskListener interface to allow applications to listen for task lifecycle events. The ITaskQueryManager provides methods to access information about submitted tasks (getAllTasks, getStoppedTasks, etc).

The Task Management Service manages tasks defined as an extension to the task framework. The task framework defines set of classes which encapsulates common attributes, relationships, and behavior of common management platform (CMP) tasks. Most methods provided by the task framework have a default implementation. A CMP model associated with the task framework classes is called a Task Model. An application developer should extend a base Task Model when creating models for application specific tasks. Each application specific simple task has to implement an execute( ) method and overwrite the default validate( ) method if necessary. The task framework provides methods for execution and validation of composite tasks based on an execution policy specified by an application. The task framework provides implementation of parallel and sequential execution policies for composite task execution. It also provides default implementation for validation of composite tasks, which is actually a call to the validate( ) method of each subtask. The task framework may support additional policies for execution and validation of composite tasks if it is required by an application. To protect system integrity, the task framework does not allow applications to take control over execution and validation of composite tasks, since these operations involve threading. To provide a standard way to pass input and output parameters between subtasks of composite tasks, the task framework provides a TaskData class. Application specific tasks may use a TaskData object to encapsulate name-value pairs or extensible markup language (XML) data with task arguments. It is an application developer's responsibility to extend the task framework and define complete models for specific tasks. These models will be loaded into a domain manager (DM) and will be used at run time for execution of application specific tasks.

The Task Management service may be provided in two ways: centralized task management or distributed task management. In the centralized approach to task management, the Task Management Service is deployed on a single DM per system installation. All tasks in the system are stored, managed and executed on that DM. In the distributed approach to task management, the Task Management Service may be installed on multiple DMs. In such a case, management and execution of tasks in the system could be delegated from one DM to another according to task specific domain.

In order to provide a sufficient level of performance, the task management service executes tasks in a multi-threaded environment. The task management service utilizes a configurable thread pool when executing tasks. Using a configurable thread pool allows the task management service to balance the need for task execution performance with the consumption of server resources. The classes and interfaces in the task management service involved in multi-threaded task execution are described herein below.

The singleton TaskExecutionManager class is responsible for executing the top-level tasks submitted to the TaskManagementService and informing registered listeners when all executed tasks complete. When the task execution manager is started, the task execution manager creates three private Runnable service class instances and starts them in three independent threads. Each of these private services plays a distinct role in the execution of a task. The TaskExecutionManagerMonitor continuously checks for the completion of top-level tasks that have been executed by the task execution manager. When a top-level task completes, the monitor adds the task to the completed tasks queue and frees the thread on which the top-level task was executed. The TaskExecutionManagerNotifier continuously checks the completed tasks queue and when a task is added to the queue, notifies any registered listeners that the task has completed. The completed task queue can contain any task executed by the task execution manager including all subtasks of top-level tasks that are composite tasks. The TaskExecutionManagerExecutor continuously requests the next task to be executed from the Task- QueueManager. When one is ready to be executed, the executor asks the TaskResourceManager to reserve the resources required to execute the task, where one of the resources is the threads required to execute the task. If the resources may be reserved, the task is submitted to the TaskExecutor for execution. If the resources may not be reserved, the task is handed back to the TaskQueueManager.

The singleton TaskQueueManager class is responsible for managing all tasks that are ready for execution, prioritizing them, and determining the task that should be executed next. The tasks managed by the task queue manager may include tasks that were submitted for immediate execution, scheduled tasks that are now ready to execute, previously executed tasks that were stopped or failed, and tasks for which the resources required for the task are not yet available. The TaskExecutionManager continuously queries the task queue manager for the next task to execute, and when one is ready, the TaskExecutionManager attempts to execute the task.

The singleton TaskResourceManager class is responsible for reserving the resources required to successfully execute a given task. Before the TaskExecutionManager submits a task for execution to the TaskExecutor, it uses the TaskResourceManager to reserve the resources required by the task to be executed. Using the ReservationService, the task resource manager attempts to secure the reservations required by the task. In addition, the task resource manager attempts to reserve the threads required by the task from the TaskExecutor. The TaskResourceManager informs the TaskExecutionManager whether or not the resources were successfully reserved. If so, the TaskExecutionManager will submit the task for execution, otherwise the task is handed back to the TaskQueueManager.

The singleton TaskExecutor class is responsible for executing all tasks. It is responsible for executing the top-level tasks submitted for execution by the TaskExecutionManager. It is also responsible for executing the subtasks of top-level tasks that are composite tasks. Tasks executed by the task executor may be executed in the current thread or alternatively in a separate thread. For tasks executed in separate threads, the task executor uses a standard Java ThreadPoolExecutor to execute tasks on a configurable, fixed-size thread pool.

The TaskExecutor also provides the ability to reserve/unreserve the threads in the thread pool of its ThreadPoolExecutor ahead of time. Before any top-level task can be executed, the TaskResourceManager must first reserve all threads required to execute the task. If there are not enough free threads, then the task cannot be executed until previously executed tasks complete and their threads are freed. If a request is made to execute a task in a separate thread and the task does not have a thread reserved for it, the request is ignored.

The TaskCallable class is a wrapper class for tasks that are submitted to the TaskExecutor for execution is a separate thread. The java ThreadPoolExecutor used by the TaskExecutor expects submitted tasks to implement either the Java Runnable or Callable interface. The Callable interface was chosen because it is capable of returning a result, in this case, the TaskExecutionResult resulting from the task execution. When the TaskCallable instance is submitted to the TaskExecutor, the TaskCallable call( ) method is invoked, which in turn calls the execute( ) method of the wrapped Task.

A CompositeTask delegates execution of the task to the TaskExecutionStrategy associated with the CompositeTask. The TaskExecutionStrategy knows how the subtasks of the CompositeTask should be executed. Currently there are two distinct execution strategies, the SerialExecutionStrategy and the ParallelExecutionStrategy. The SerialExecutionStrategy executes the subtasks in a serial manner in the same thread in which the CompositeTask is executing. The ParallelExecutionStrategy executes the subtasks in a parallel manner where each subtask executes in a different thread.

The SerialExecutionStrategy executes the subtasks in a serial manner in the same thread in which the CompositeTask is executing. The SerialExecutionStrategy loops through the subtasks and delegates execution of each subtask to the TaskExecutor. The TaskExecutor simply executes the task and when it completes, notifies the TaskExecutionManager that the task has completed. Because the subtasks are executed serially and because no new threads are created to execute the subtasks, each subtask will execute and complete in order, and when all subtasks have completed, the CompositeTask will be completed.

The ParallelExecutionStrategy delegates execution of the subtasks of a CompositeTask to the ParallelTaskCompletionService. The ParallelTaskCompletionService class is capable of executing multiple tasks simultaneously in separate threads and waiting for each of the tasks to complete. The ParallelTaskCompletionService uses the ThreadPoolExecutor from the TaskExecutor to execute the set of tasks in parallel. As each task completes, the ParallelTaskCompletionService frees the thread in which the subtask was executed and then notifies the TaskExecutionManager that the subtask completed. Once all subtasks have completed, the CompositeTask will be completed. Because the subtasks are executed in parallel in separate threads, the order of completion is indeterminate. However, the ParallelTaskCompletionService ensures that the CompositeTask will not complete until all subtasks have completed.

Embodiments disclosed herein provide for comparing configurations of a storage area network, as described below. More particularly, FIG. 1 is a block diagram illustrating example architecture of a computer system 110 that executes, runs, interprets, operates or otherwise performs a mapping application 140-1 and a mapping process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network to provide input commands and generally administer develop applications through graphical user interfaces (shown in FIGS. 2A and 2B) that are provided on a display 130. The communications interface 115 enables the computer system 110 to communicate with other devices on a network 135, such as but not limited to components of the storage area network (not shown) and a managed object database 127.

The memory system 112 is any type of computer readable medium and in this example is encoded with a mapping application 140-1 that includes mapping process 140-2. The mapping application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the mapping application 140-1 as well as the console application 122. Execution of the mapping application 140-1 in this manner produces processing functionality in a mapping process 140-2. Similarly, execution of the console application 122 produces processing functionality in a console process 123. In other words, the mapping process 140-2 represents one or more portions or runtime instances of the mapping application 140-1 performing or executing within or upon the processor 113 in the computer system 110 at runtime.

It is noted that example configurations disclosed herein include the mapping application 140-1 itself including the mapping process 140-2 (i.e., in the form of un-executed or non-performing logic instructions and/or data). The mapping application 140-1 may be stored on a computer readable medium (such as a floppy disk), hard disk, electronic, magnetic, optical or other computer readable medium. The mapping application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the mapping application 140-1 in the processor 113 as the mapping process 140-2. Those skilled in the art will understand that the computer system 110 may include other processes and/or software and hardware components, such as an operating system not shown in this example.

Figure 2B:
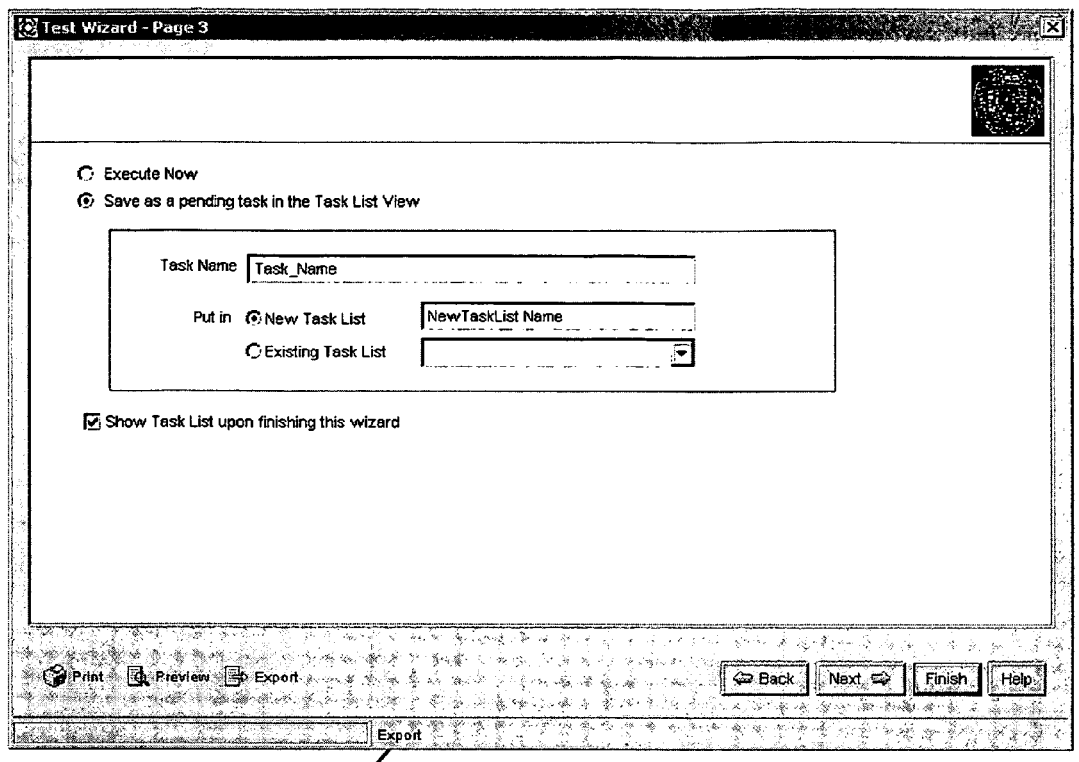
Figure 3:
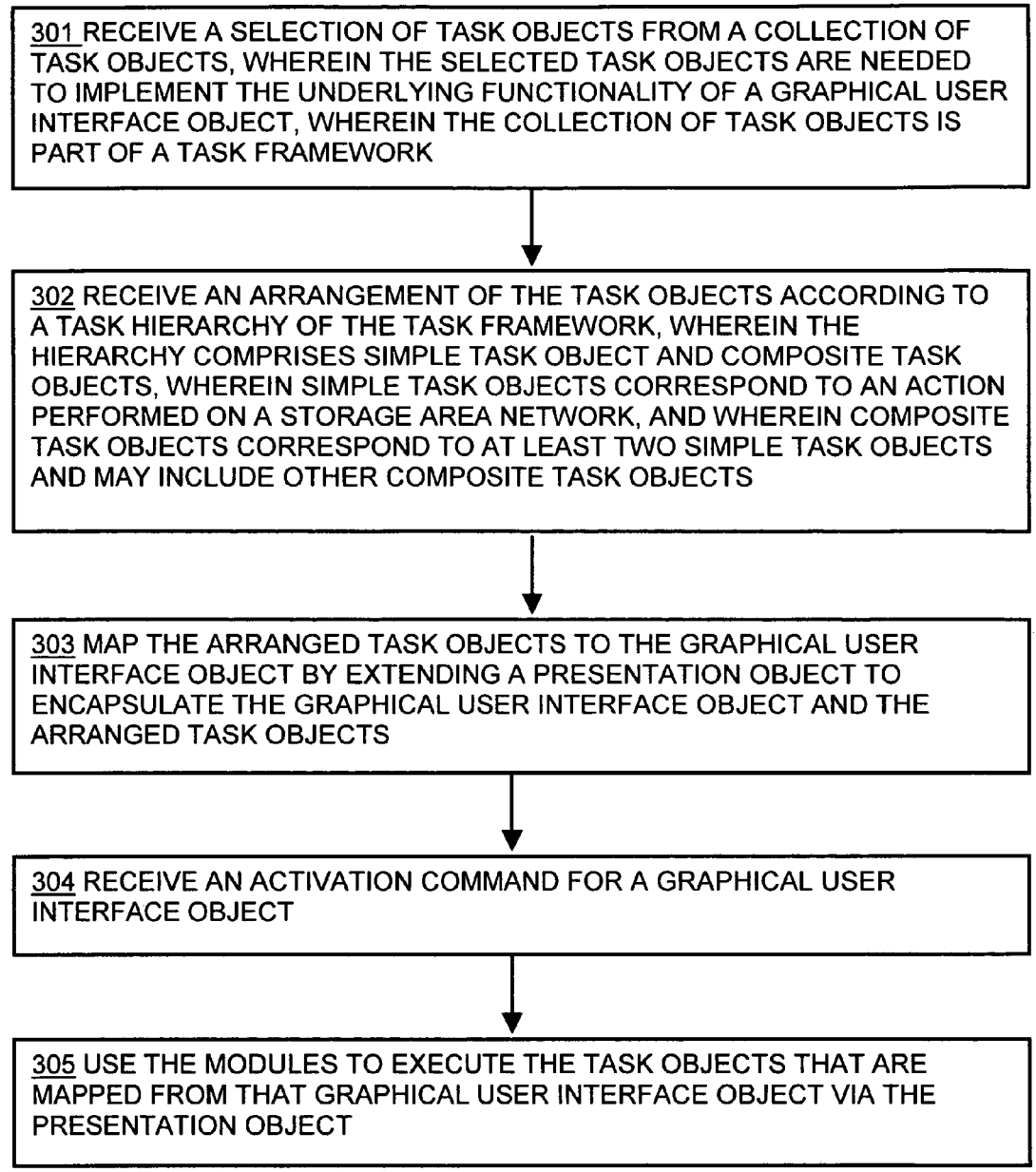
FIG. 3 illustrates a flowchart of a procedure performed by the system of FIG. 1 when mapping a graphical user interface object to an underlying task object.
Figure 4B:
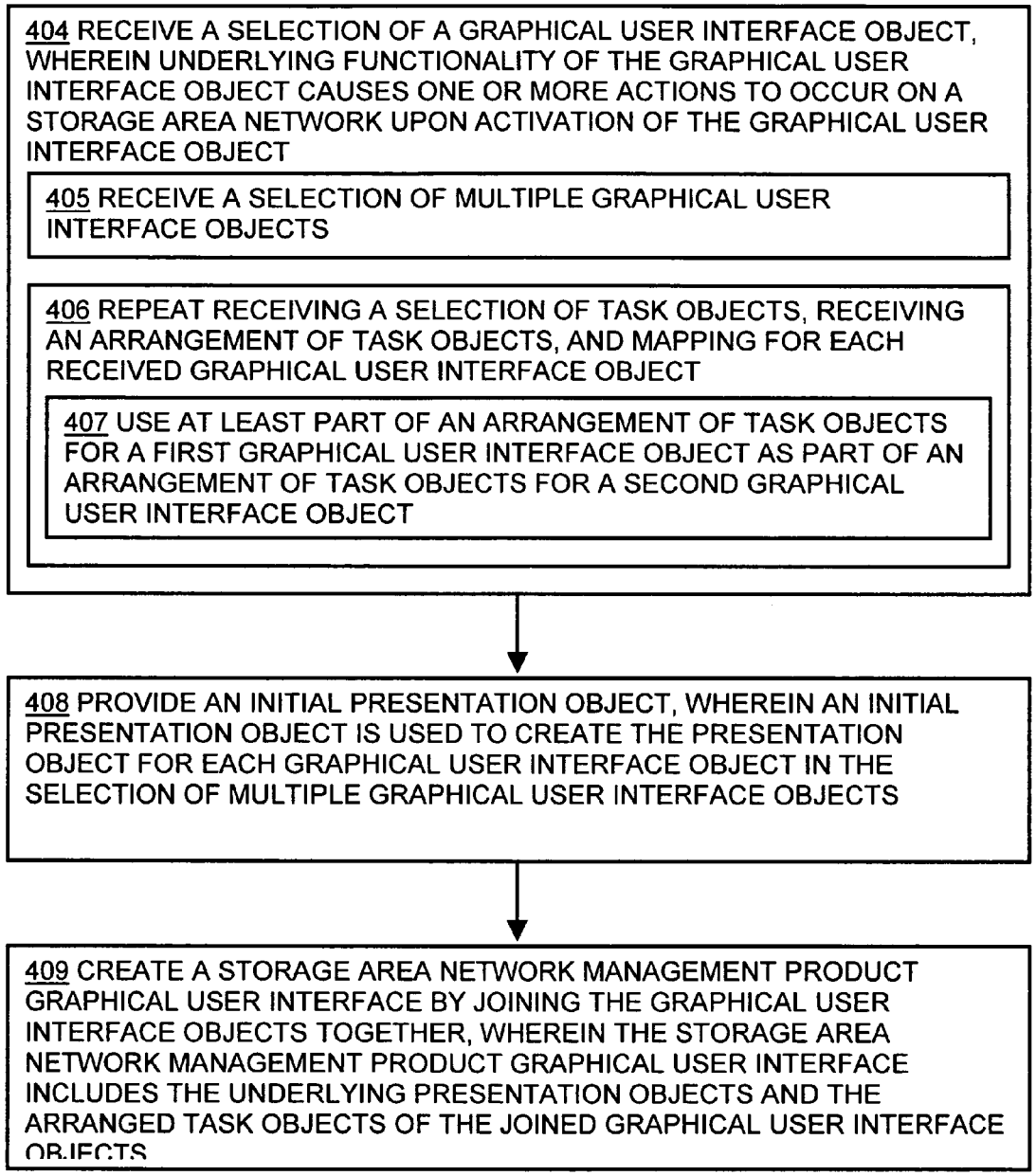
FIG. 4 illustrates a flowchart of a procedure performed by the system of FIG. 1 when mapping multiple graphical user interface objects to respective underlying task objects.
Figure 5B:
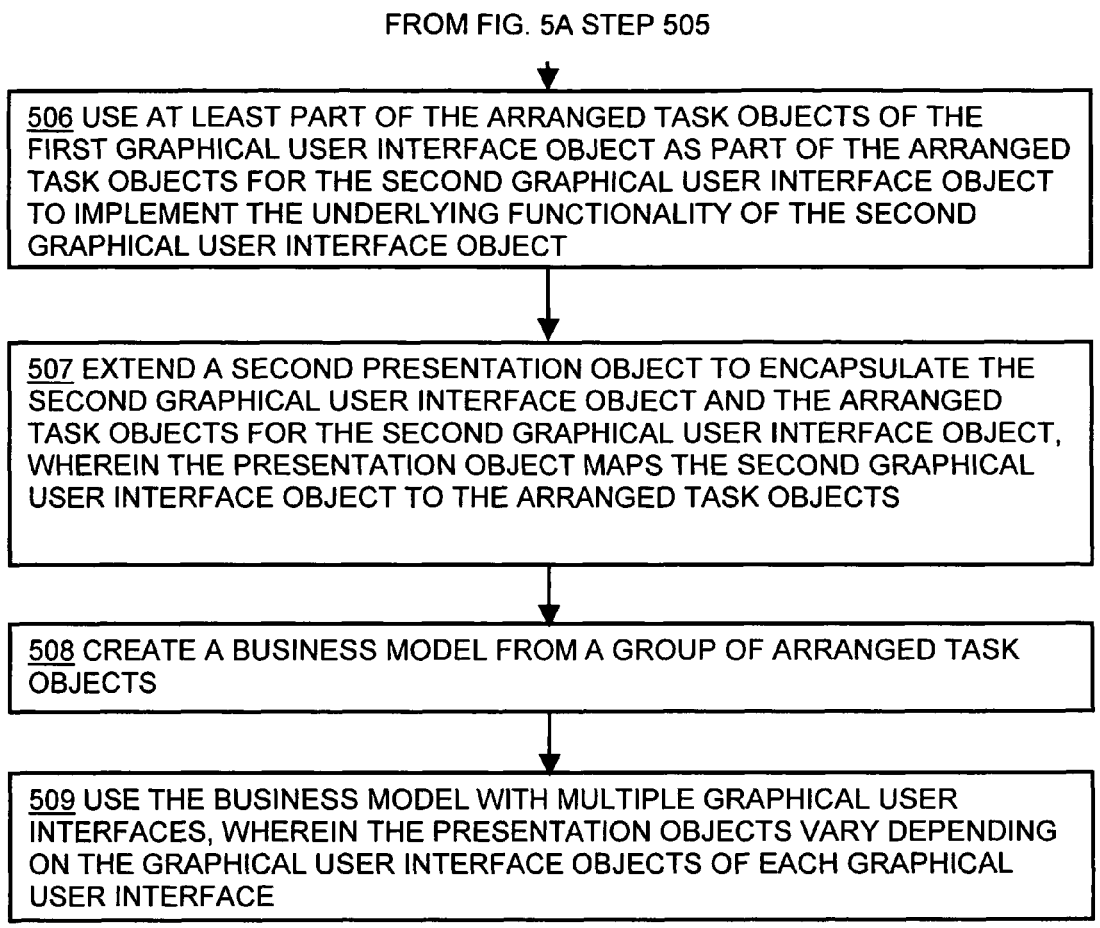
FIGS. 5 and 6 illustrate flowcharts of a procedure performed by an application developer on the system of FIG. 1 when mapping a GUI object to the task objects that provide the underlying functionality of the GUI object.
Figure 6B:
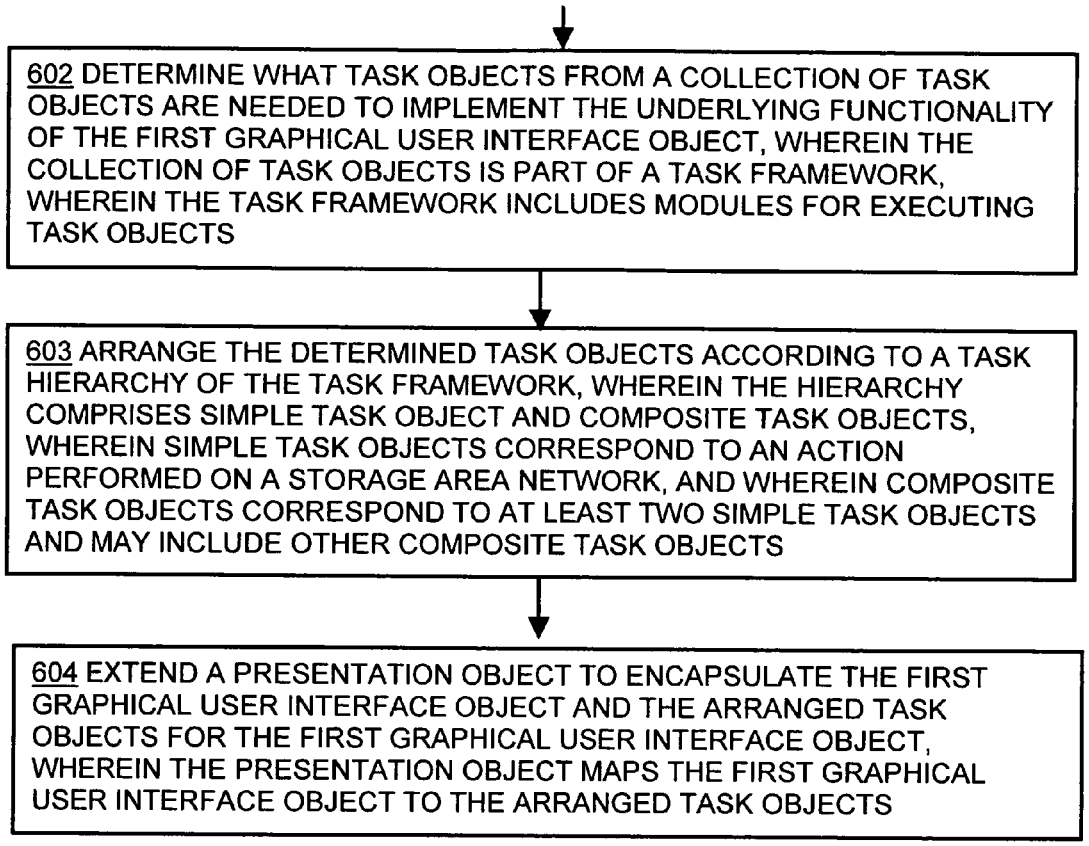

FIGS. 2A and 2B are screenshots of the task manager module and the view module of the task management framework that execute on the computer system of FIG. 1. FIG. 3 illustrates a flowchart of a procedure performed by the system of FIG. 1 when mapping a graphical user interface object to an underlying task object. FIG. 4 illustrates a flowchart of a procedure performed by the system of FIG. 1 when mapping multiple graphical user interface objects to respective underlying task objects. FIGS. 5 and 6 illustrate flowcharts of a procedure performed by an application developer on the system of FIG. 1 when mapping a GUI object to the task objects that provide the underlying functionality of the GUI object.

A user 108 (shown in FIG. 1), such as an application developer, uses the task manager module 165 and the view module 170 of the task management framework shown in FIGS. 2A and 2B to develop a storage area network management application, where the underlying functionality of the application is separate from the graphical user object of the application. The underlying functionality is provided by task objects. Task objects include actions performed on a storage area network. The graphical user interface of the application is ultimately comprised of graphical user interface objects of the developer's choosing, though as discussed below, a preexisting graphical user interface and its objects may be used.

The developer selects a first graphical user interface object for the storage area network management graphical user interface, wherein underlying functionality of the selected first graphical user interface object causes one or more actions to occur on a storage area network upon activation of the first graphical user interface object, step 501/step 601. The mapping process 140-2 receives this selection, step 404. The application developer then determines what task objects from a collection of task objects are needed to implement the underlying functionality of the first graphical user interface object, step 502/step 602. The collection of task objects is part of a task framework, wherein the task framework includes modules for executing task objects, such as those described in detail above. The mapping process 140-2 receives the selection of task objects from the collection of task objects, step 301/step 401.

The developer then arranges the determined task objects according to a task hierarchy of the task framework, wherein the hierarchy comprises simple task object and composite task objects, wherein simple task objects correspond to an action performed on a storage area network, and wherein composite task objects correspond to at least two simple task objects and may include other composite task objects, step 503/step 603. The mapping process 140-2 receives the arrangement of the task objects, step 302/step 402. Finally, the application developer extends a presentation object to encapsulate the first graphical user interface object and the arranged task objects for the first graphical user interface object, wherein the presentation object maps the first graphical user interface object to the arranged task objects, step 504/step 604. The mapping process 140-2 performs the actual mapping of the arranged task objects to the graphical user interface object by extending a presentation object to encapsulate the graphical user interface object and the arranged task objects, step 303/step 403.

The task framework includes modules for executing task objects, as described above. Thus, after the graphical user interface object has been developed as described and mapped to task objects that provide its underlying functionality, the graphical user interface object may be activated. The mapping process 140-2 receives an activation command for a graphical user interface object, step 304, and uses the modules to execute the task objects that are mapped from that graphical user interface object via the presentation object, step 305.

An application developer may work on two or more graphical interface objects at a time. For example, if the application developer selects a second graphical user interface object for the storage area network management graphical user interface, wherein underlying functionality of the selected second graphical user interface object causes one or more actions to occur on a storage area network upon activation of the second graphical user interface object, step 505, then the mapping process 140-2 receives this selection, step 405, and performs steps 402-404 for each received graphical user interface object, step 406. During the repeating of step 403 for a second graphical user interface object, the mapping process 140-2 may use at least part of an arrangement of task objects for a first graphical user interface object as part of an arrangement of task objects for the second graphical user interface object, step 407.

Thus, an application developer is able to use at least part of the arranged task objects of the first graphical user interface object as part of the arranged task objects for the second graphical user interface object to implement the underlying functionality of the second graphical user interface object, step 506. The application developer then extends a second presentation object to encapsulate the second graphical user interface object and the arranged task objects for the second graphical user interface object, wherein the presentation object maps the second graphical user interface object to the arranged task objects, step 507.

When processing multiple graphical user interface objects, the mapping process 140-2 provides an initial presentation object, wherein an initial presentation object is used to create the presentation object for each graphical user interface object in the selection of multiple graphical user interface objects, step 408. Thus, it is possible for the mapping process 140-2 to create a storage area network management product graphical user interface by joining the graphical user interface objects together, wherein the storage area network management product graphical user interface includes the underlying presentation objects and the arranged task objects of the joined graphical user interface objects, step 409. It is also possible for an application developer to create a business model from a group of arranged task objects, step 508, and then use the business model with multiple graphical user interfaces, wherein the presentation objects vary depending on the graphical user interface objects of each graphical user interface, step 509.

In designing the application, the application developer may choose to add new functionality to the application. The application developer thus determines a function to be provided by the storage area network management graphical user interface, step 605, and selects one or more graphical user interface objects to be associated with the determined function, step 606. If the application developer selects more than one graphical user interface object, determining, arranging, and extending (i.e. steps 502/602, 503/603, and 504/604) are performed for each selected graphical user interface object, step 607. Though the functionality may be new, the graphical user interface objects may not. Indeed, the application developer may use one or more graphical user interface objects from a pre-existing graphical user interface, step 608. As stated above, when working with multiple graphical user interface objects, an application developer may use at least part of an arrangement of task objects for a first graphical user interface object as part of an arrangement of task objects for a second graphical user interface object, step 609.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of mapping a graphical user interface object to underlying task objects, wherein the task objects include actions performed on a storage area network, the method comprising:

receiving a selection of task objects from a collection of task objects presented for selection on an application developer graphical user interface for mapping the graphical user interface object to underlying task objects, wherein the graphical user interface object is configured for presentation on a storage area network management graphical user interface for managing the storage area network, wherein the selected task objects are needed to implement underlying functionality of the graphical user interface object, wherein the collection of task objects is part of a task framework, wherein the selection allows improvements to underlying functionality implemented by the selected task objects and maintaining a consistent user experience by displaying the graphical user interface object, wherein underlying functionality implemented by the selected task objects gathers data and computes results data and actions, and wherein the task framework comprises:

a task manager component for managing execution of task objects, wherein managing execution of task objects includes tracking a status of task object execution and allocating resources during the execution of task objects; and a view component for managing presentation objects, wherein managing presentation objects includes managing the mapping of the graphical user interface object to the selected task objects providing the underlying functionality of the graphical user interface object;

receiving an arrangement of the selected task objects according to a task hierarchy of the task framework, wherein the hierarchy comprises simple task objects and composite task objects, wherein simple task objects correspond to an action performed on a storage area network, and wherein composite task objects correspond to at least two simple task objects and may include other composite task objects;

mapping the arranged task objects to the graphical user interface object by extending a presentation object to encapsulate the graphical user interface object and the arranged task objects, the mapping comprising:

providing a separation between the graphical user interface object and the arranged task objects, the separation such that a nomenclature of the arranged task objects need not correspond to a nomenclature of the graphical user interface object; and encapsulating, in the presentation object, the graphical user interface object and the arranged task objects, the encapsulating providing the mapping from the graphical user interface object to the arranged task objects;

presenting the graphical user interface object on the storage area network management graphical user interface for managing the storage area network, wherein the arranged task objects mapped to the graphical user interface object are separated from the graphical user interface object and not able to be selected directly for activation on the storage area network management graphical user interface; and receiving a selection on the storage area network management graphical user interface of the presented graphical user interface object, resulting in underlying functionality of the graphical user interface object being activated, such that one or more actions related to the mapped task objects occur on the storage area network.

2. The method of claim 1 wherein the task framework includes modules for executing task objects, the method comprising:

receiving an activation command for a graphical user interface object; and using the modules to execute the task objects that are mapped from that graphical user interface object via the presentation object.

3. The method of claim 1 wherein presenting comprises:

presenting multiple graphical user interface objects on a graphical user interface, wherein any task objects mapped to any graphical user interface objects are separated from the graphical user interface object and not presented on the graphical user interface for execution by a user;

wherein receiving a selection of the presented graphical user interface object comprises:

receiving a selection of multiple presented graphical user interface objects; and performing receiving a selection of task objects, receiving an arrangement of task objects, and mapping for each received graphical user interface object not already mapped to one or more task objects.

4. The method of claim 3 comprising:

providing an initial presentation object, wherein an initial presentation object is used to create the presentation object for each graphical user interface object in the selection of multiple graphical user interface objects.

5. The method of claim 3 wherein, during the repeating of receiving an arrangement of task objects, using an arrangement of task objects mapped to a first graphical user interface object as the arrangement of task objects for a second graphical user interface object, wherein the first graphical user interface object is presented on a first graphical user interface and the second graphical user interface object is presented on a second graphical user interface.

6. The method of claim 3 comprising:

creating a storage area network management product graphical user interface by joining the graphical user interface objects together, wherein each graphical user interface object is presented by the storage area network management product graphical user interface, wherein the storage area network management product graphical user interface includes the underlying presentation objects and the arranged task objects of the joined graphical user interface objects, wherein the underlying presentation objects and the arranged task objects are separated from a user and are not presented by the storage area network management product graphical user interface.

7. The method of claim 1 wherein the separation provides a design of the graphical user interface object without necessitating the separated design affecting the encapsulated task objects providing underlying functionality.

8. The method of claim 1 wherein the task objects including simple task objects and composite task objects defined in the hierarchy, the composite task objects including at least one simple task object, the method further comprising:

executing the simple task objects and composite task objects according to the an order defined in the hierarchy, the tasks objects included in a composite task object being executed as a subtask of the composite task object, each of the subtasks executed according to a one of a plurality of execution strategies, the execution strategies including serial and parallel execution, executing further comprising:
    enqueueing the task objects for execution according to the order specified in the hierarchy;
    notifying waiting tasks objects of completion of enqueued subtasks; and
    denoting a composite task object as completed upon notification of the respective subtasks.

9. The method of claim 1 wherein the task framework defines a set of classes which encapsulate common attributes, relationships, and behavior of common management platform tasks and methods provided by the task framework include a default implementation.

10. The method of claim 1 wherein the nomenclature of the arranged task objects comprises a first system for naming the task objects and the nomenclature of the graphical user interface objects comprises a second system for naming the graphical user interface objects.

11. A computer program product, stored on computer readable storage medium, including program logic encoded whereon that, when executed on a processor of a computer system, maps a graphical user interface object to underlying task objects, wherein the task objects include actions performed on a storage area network, the computer program product comprising:
    computer program code for receiving a selection of task objects from a collection of task objects presented for selection on an application developer graphical user interface for mapping the graphical user interface object to underlying task objects, wherein the graphical user interface object is configured for presentation on a storage area network management graphical user interface for managing the storage area network, wherein the selected task objects are needed to implement underlying functionality of the graphical user interface object, wherein the collection of task objects is part of a task framework, wherein the selection allows improvements to underlying functionality implemented by the selected task objects and maintaining a consistent user experience by displaying the graphical user interface object, wherein underlying functionality implemented by the selected task objects gathers data and computes results data and actions, and wherein the task framework comprises:
        a task manager component for managing execution of task objects, wherein managing execution of task objects includes tracking a status of task object execution and allocating resources during the execution of task objects; and
        a view component for managing presentation objects, wherein managing presentation objects includes managing the mapping of the graphical user interface object to the selected task objects providing the underlying functionality of the graphical user interface object;
    computer program code for receiving an arrangement of the selected task objects according to a task hierarchy of the task framework, wherein the hierarchy comprises simple task objects and composite task objects, wherein simple task objects correspond to an action performed on a storage area network, and wherein composite task objects correspond to at least two simple task objects and may include other composite task objects;
    computer program code for mapping the arranged task objects to the graphical user interface object by extending a presentation object to encapsulate the graphical user interface object and the arranged task objects, the computer program code for mapping comprising:
        computer program code for providing a separation between the graphical user interface object and the arranged task objects, the separation such that a nomenclature of the arranged task objects need not correspond to a nomenclature of the graphical user interface object; and
        computer program code for encapsulating, in the presentation object, the graphical user interface object and the arranged task objects, the encapsulating providing the mapping from the graphical user interface object to the arranged task objects;
    computer program code for presenting the graphical user interface object on the storage area network management graphical user interface for managing the storage area network, wherein the arranged task objects mapped to the graphical user interface object are separated from the graphical user interface object and not able to be selected directly for activation on the storage area network management graphical user interface; and
    computer program code for receiving a selection on the storage area network management graphical user interface of the presented graphical user interface object, resulting in underlying functionality of the graphical user interface object being activated, such that one or more actions related to the mapped task objects occur on the storage area network.

12. The computer program product of claim 11 wherein the task framework includes modules for executing task objects, the method comprising:
    computer program code for receiving an activation command for a graphical user interface object; and
    computer program code for using the modules to execute the task objects that are mapped from that graphical user interface object via the presentation object.

13. The computer program product of claim 11 comprising, during the repeating of receiving an arrangement of task objects, computer program code for using an arrangement of task objects mapped to a first graphical user interface object as the arrangement of task objects for a second graphical user interface object, wherein the first graphical user interface object is presented on a first graphical user interface and the second graphical user interface object is presented on a second graphical user interface.

14. The computer program product of claim 11 further comprising:
    computer program code for creating a storage area network management product graphical user interface by joining a plurality of graphical user interface objects together, wherein each graphical user interface object is presented by the storage area network management product graphical user interface, wherein the storage area network management product graphical user interface includes the underlying presentation objects and the arranged task objects of the joined graphical user interface objects, wherein the underlying presentation objects and the arranged task objects are separated from a user and are not presented by the storage area network management product graphical user interface.

15. A method of mapping a graphical user interface object to underlying task objects, wherein the task objects includes actions performed on a storage area network, and wherein graphical user interface objects comprise a graphical user interface of a storage area network management product, the method comprising:
  selecting a first graphical user interface object on the storage area network management product graphical user interface, wherein a selection of task objects from a collection of task objects presented for selection on an application developer graphical user interface for mapping the first graphical user interface object to underlying task objects, wherein the first graphical user interface object is configured for presentation on the storage area network management product graphical user interface for managing the storage area network, wherein the selected task objects implement underlying functionality of the selected first graphical user interface object and causes one or more actions to occur on the storage area network upon activation of the first graphical user interface object, wherein the selection allows improvements to underlying functionality implemented by the selected task objects and maintaining a consistent user experience by displaying the first graphical user interface object, wherein underlying functionality implemented by the selected task objects gathers data and computes results data and actions, wherein the task objects mapped to the first graphical user interface object are separated from the first graphical user interface object and not able to be selected directly for activation;
  determining what task objects from a collection of task objects are needed to implement underlying functionality of the first graphical user interface object, wherein the collection of task objects is part of a task framework, wherein the task framework includes modules for executing task objects; comprising:
    a task manager component for managing execution of task objects, wherein managing execution of task objects includes tracking a status of task object execution and allocating resources during the execution of task objects; and
    a view component for managing presentation objects, wherein managing presentation objects includes managing the mapping of the first graphical user interface object to the selected task objects providing the underlying functionality of the first graphical user interface object;
  arranging the determined task objects according to a task hierarchy of the task framework, wherein the hierarchy comprises simple task objects and composite task objects, wherein simple task objects correspond to an action performed on a storage area network, and wherein composite task objects correspond to at least two simple task objects and may include other composite task objects;
  extending a presentation object to encapsulate the first graphical user interface object and the arranged task objects for the first graphical user interface object, wherein the presentation object maps the first graphical user interface object to the arranged task objects, the mapping comprising:
    providing a separation between the first graphical user interface object and the arranged task objects, the separation such that a nomenclature of the arranged task objects need not correspond to a nomenclature of the first graphical user interface object; and
    encapsulating, in the presentation object, the first graphical user interface object and the arranged task objects, the encapsulating providing the mapping from the first graphical user interface object to the arranged task objects;
  presenting the first graphical user interface object on the storage area network management product graphical user interface for managing the storage area network, wherein the arranged task objects mapped to the first graphical user interface object are separated from the first graphical user interface object and not able to be selected directly for activation on the storage area network management product graphical user interface; and
  receiving a selection on the storage area network management product graphical user interface of the presented first graphical user interface object, resulting in underlying functionality of the first graphical user interface object being activated, such that one or more actions related to the mapped task objects occur on the storage area network.

16. The method of claim 15 comprising:
  selecting a second graphical user interface object for the storage area network management product graphical user interface, wherein underlying functionality of the selected second graphical user interface object causes one or more actions to occur on a storage area network upon activation of the second graphical user interface object;
  using at least part of the arranged task objects of the first graphical user interface object as part of arranged task objects for the second graphical user interface object to implement underlying functionality of the second graphical user interface object; and
  extending a second presentation object to encapsulate the second graphical user interface object and the arranged task objects for the second graphical user interface object, wherein the second presentation object maps the second graphical user interface object to the arranged task objects.

17. The method of claim 15 wherein selecting comprises:
  determining a function to be provided by the storage area network management product graphical user interface; and
  selecting one or more graphical user interface objects to be associated with the determined function;
  wherein, if more than one graphical user interface object is selected, determining, arranging, and extending are performed for each selected graphical user interface object.

18. The method of claim 17 wherein more than one graphical user interface object is selected and wherein during the repeating of arranging the determined task objects, using at least part of an arrangement of task objects for a first graphical user interface object as part of an arrangement of task objects for a second graphical user interface object.

19. The method of claim 17 wherein selecting one or more graphical user interface objects comprises:
  using one or more graphical user interface objects from a pre-existing graphical user interface.

20. The method of claim 15 comprising:
  creating a business model from a group of arranged task objects; and
  using the business model with multiple graphical user interfaces, wherein the presentation objects vary depending on the graphical user interface objects of each graphical user interface.

* * * * *